Nov. 13, 1962  O. W. OERMAN ETAL  3,063,504
FRONT MOUNTED BEDDER
Filed March 17, 1960  3 Sheets-Sheet 1
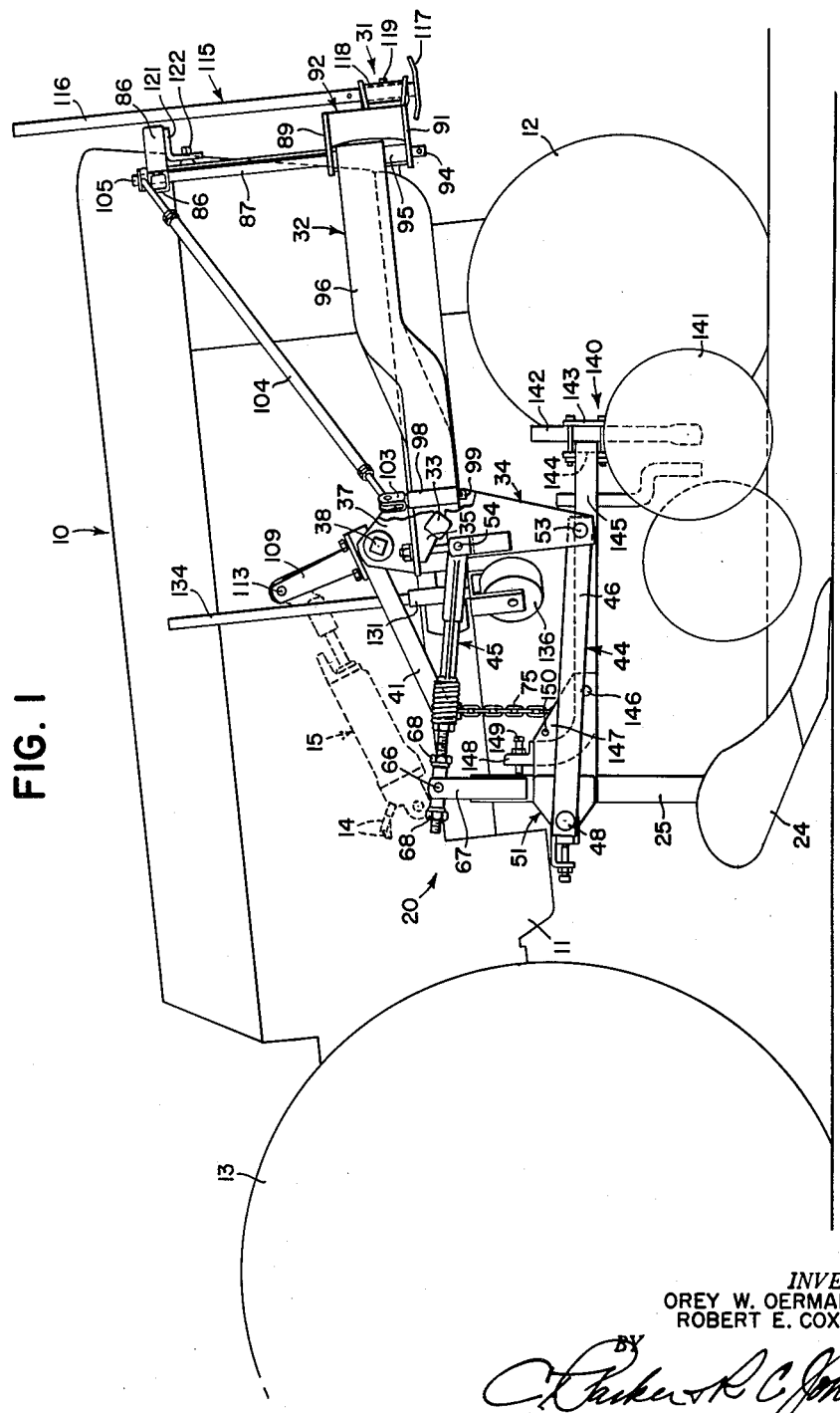
INVENTORS.
OREY W. OERMAN
ROBERT E. COX
BY
ATTORNEYS

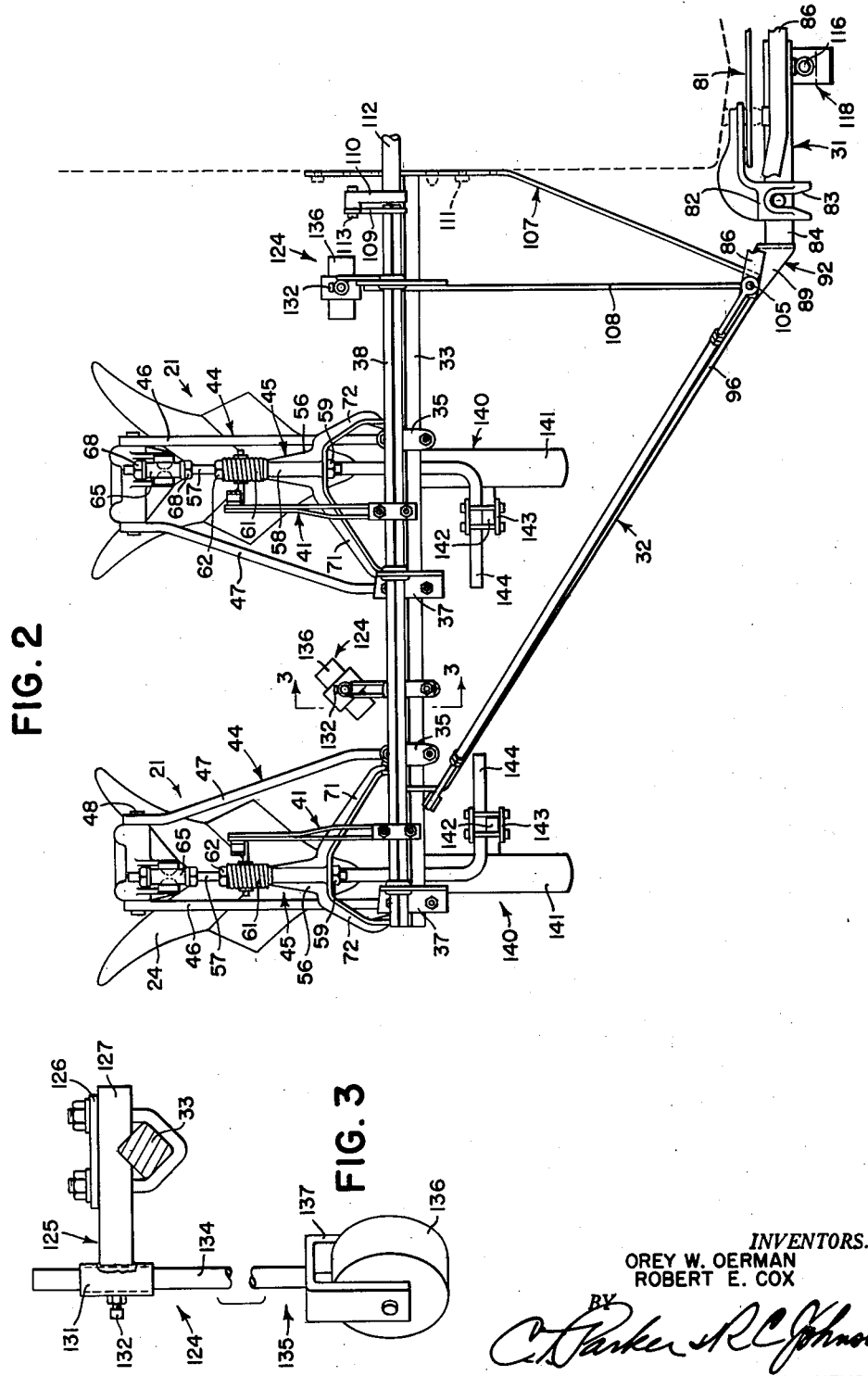

Nov. 13, 1962   O. W. OERMAN ETAL   3,063,504
FRONT MOUNTED BEDDER

Filed March 17, 1960   3 Sheets-Sheet 3

INVENTORS.
OREY W. OERMAN
ROBERT E. COX
ATTORNEYS

United States Patent Office 3,063,504
Patented Nov. 13, 1962

3,063,504
FRONT MOUNTED BEDDER
Orey W. Oerman and Robert E. Cox, Moline, Ill., assignors to Deere & Company, Moline, Ill., a corporation of Delaware
Filed Mar. 17, 1960, Ser. No. 15,733
5 Claims. (Cl. 172—273)

The present invention relates generally to agricultural implements and more particularly to ground working implements, such as listers, bedders, middlebreakers or the like.

The object and general nature of this invention is the provision of new and improved means facilitating the mounting of implements of the above-mentioned type directly on farm tractors. More specifically it is an important feature of this invention to provide means facilitating the ready and easy connection and disconnection of such implements to and from the associated tractor.

Specifically, it is a feature of this invention to provide articulated frame means carrying the ground working tools and ground engaging wheel means so constructed and arranged as to facilitate the movement of the articulated frame sections into and out of the tractor-mounted position.

Further, a more specific feature of this invention is the provision of tool-carrying articulated frame means that includes a center section and side sections hinged to the center section, the side sections being adapted to be swung outwardly to facilitate driving the tractor into position to receive the center section, after which the side sections are then swung inwardly toward the tractor for connection therewith. In this respect, the present invention contemplates the provision of an auxiliary wheel attachment connectible to the outer frame sections so that by suitably adjusting the wheel attachment, the latter may be disposed in a position so that the axis of rotation of the auxiliary wheel means extends substantially through the vertical axis of frame movement, whereby the frame section, supported at least partially by the auxiliary wheel means, may readily and with relative ease be rolled into and out of position with respect to the tractor.

Another feature of this invention is the provision of new and improved gauge wheel means associated with each ground working tool and so constructed and arranged that when the implement is raised for transport, the gauge wheels are free to drop down to about the level of the lower portions of the ground working means, whereby interference between the gauge wheels and the associated tractor or mounting parts, such as the draft beam, is eliminated, thus providing for a higher lift than would otherwise be practical.

These and other objects and advantages of the present invention will be apparent to those skilled in the art after a consideration of the following detailed description, taken in conjunction with the accompanying drawings, in which:

FIG. 1 is a side view of an implement and tractor combination, in which the principles of the present invention have been incorporated, the various parts being shown in the positions they occupy in their normal ground working position.

FIG. 2 is a partial plan view of the outfit shown in FIG. 1.

FIG. 3 is a fragmentary enlarged sectional view taken along the line 3—3 of FIG. 2, showing certain details of the auxiliary wheel support.

Figure 4:
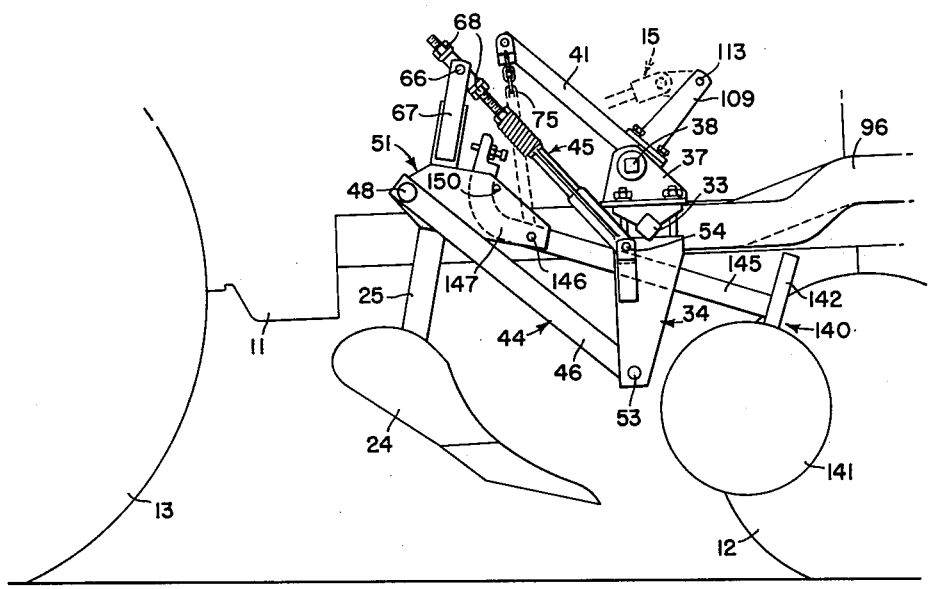
FIG. 4 is a fragmentary view, similar to FIG. 1, showing the lifted position of the implement and the corresponding position of the gauge wheels.

Referring first to FIG. 1, the tractor is indicated in its entirety by the reference numeral 10 and is of conventional construction, incorporating a generally fore-and-aft extending frame means 11, steerable front wheel means 12 and rear drive wheel means 13. The tractor also includes suitable hydraulic power means, including hose lines 14 extending to a power cylinder 15 disposed at each side of the tractor.

The implement is indicated in its entirety by the reference numeral 20 and includes a pair of ground working units 21 at each side of the tractor, each unit including a bedder bottom 24 connected to a vertical beam 25. The implement 20 also includes attaching or hitch means connecting the ground working means with the tractor 10, and the implement hitch means includes a generally central frame section 31 and two outer frame sections 32. Only one of the latter frame sections is shown in detail since the two outer frame sections are substantially identical except that certain parts thereof may be right or left hand, as the case may be.

Each outer frame section 32 is made up of a transverse square bar 33 to which two pairs of depending brackets 34 are connected by pairs of clamp means 35, the upper ends of the brackets 34 and the associated clamp means 35 being shaped to conform to the tool bar 33, as best shown in FIG. 1. Mounted on one clamp member 35 of each pair is a rockshaft supporting bracket 37, the brackets 37 carrying suitable bearing means in which a rockshaft 38 is supported. A pair of arms 41 are fixed to the rockshaft 38, there being one arm above each ground working unit 21, as best shown in FIG. 2. Each of the ground working units 21 comprises not only the associated bedder bottom 24 and vertical beam 25 mentioned above but also a pair of generally parallel lower and upper link members 44 and 45. Each lower link member 44 is made up of a pair of bars 46 and 47, as will be seen from FIG. 2. For the laterally outer ground working unit 21, the laterally outer bar 46 comprises a generally straight fore-and-aft extending member pivotally connected at its rear end by a pin or shaft 48 to bracket means 51 fixedly carried by the associated beam 25. The pivot member 48 extends all the way through the bracket 51 and at the inner end receives the rear end of the associated generally forwardly and laterally inwardly extending link member 47, whose configuration is best shown in FIG. 2. The forward ends of the link members or bars 46 and 47 are pivotally connected, as at 53, to the associated depending brackets 34 that are fixedly connected to the tool bar 33 as described above.

Each upper link means 45 includes a forward yoke member 56 and a rear threaded shaft member 57 the forward end of which extends all the way through the barrel section 58 of the forward yoke member 56 and receives a lock nut 59 thereon. A spring 61 is disposed about the member 57 between the rear portion of the barrel section 58 and a nut 62 threaded onto the generally central portion of the threaded member 57. The rear end of each member 57 extends through a trunnion member 65 pivoted, as at 66, to the upper ends of a pair of hammer straps 67 (FIG. 1) fixed to the upper portion of the beam 25. Lock nuts 68 serve to fix the trunnion member 65 in position in a fore-and-aft direction along the threaded member 57. The spring member 61 acts as cushioning means yieldably resisting forward displacement of the upper portion of the beam 25 which may be subjected to severe stresses if the bottom 24 should strike a stone or other obstruction. When the associated spring 61 yields, the bottom swings rearwardly generally about the axis of the pivot 48.

Each upper link means includes the forked yoke member 56 mentioned above, and each of these members includes a relatively forwardly and laterally outwardly extending section 71 and a generally directly forwardly extending section 72. As will be seen from FIG. 2, the upper link means 45 is thus provided with laterally spaced apart portions (71 and 72) that assure lateral rigidity. The forward end of each of the link portions 71 and 72 is pivotally connected with the upper end of the associated bracket 34, as indicated at 54 in FIG. 1.

The purpose of having one of the arms 71 extend laterally farther than the other arm, which extends generally directly fore and aft, will be apparent from FIG. 2. For the purpose of securing rigidity, it is desirable to connect the forward portion of each upper link 45 with the associated tool bar 33 in relatively widely spaced apart points, yet it is undesirable to have the draft bar 33 extend laterally out beyond the outermost ground operating unit, so that there will be little or no possibility for the outer end of the draft bar 33 to strike trees or other objects. Therefore, by arranging the parts making up the draft links 45 as shown in FIG. 3, the generally fore-and-aft extending outer link of the laterally outermost bedder bottom 24 lies close to the outer end of the draft bar 33, but the point of connection between the longer arm 71 and the draft bar 33 lies an appreciable distance well inwardly of the outer end of the draft bar 33. Thus, lateral rigidity is obtained but without having the draft bar 33 extend laterally outwardly beyond the associated bedder bottom.

So far as the laterally inner ground working unit is concerned, the member 45 is reversed so that the angled arm 71 extends laterally outwardly, which permits the laterally inner bottom 24 to be disposed fairly close to the side of the tractor without having the latter or parts thereon interfere with the operation of any of the other parts of the implement, even in the wider row spacings. The outer end of each of the lift arms 41 is connected with the associated lower link 44, as by being connected to one of the bars 46 and 47 through a suitable chain 75 or other suitable means.

Referring again to the attaching or hitch means mentioned above as including a central frame section 31 and two outer frame sections 32, it will be seen, particularly from FIG. 2, that the hitch means includes a central member 81 attachable to the front of the tractor and carrying at each end a pair of generally forwardly directed upper and lower yokes 82, each of which is forked, as shown at 83, and spaced apart vertically to releasably receive a lower square tube 84 that forms the lower part of the central frame section 31. The member 81 is normally fixed to and may be carried more or less permanently on the tractor.

The central frame section 31 also includes an upper transverse bar 86 connected at its ends to generally vertical struts, each in the form of a square tube 87, the lower ends of which are securely fixed to upper and lower sections 89 and 91 of the associated lower yoke member 92. A yoke member 92 is fixed to each end of the lower tube 84. Each pair of upper and lower yoke sections 89 and 91 carries a vertical pivot member 94 receiving a sleeve 95 that is welded to and becomes a part of a laterally and rearwardly extending bar 96, the rear and laterally outer end of which carries a vertical sleeve 98 (FIG. 1) in which a pivot member 99 is swiveled. The upper end of the pivot 99 is provided with spaced apertured portions 103 receiving the lower portion of an adjustable brace rod 104. The forward and upper end of the rod 104 is pivoted to the upper end 105 of the associated vertical pivot member 94, which extends upwardly through the vertical strut 87 and the adjacent end of the bar 86. Each outer frame section 32 also includes a generally rearwardly extending bar 107, the forward end of which is welded to the sleeve 95. The rear end of each of the members 107 is adapted to be bolted or otherwise fixed against the adjacent side of the tractor frame. As will be seen from FIG. 2, the rear ends of the bars 96 and 107, and a fore-and-aft bar 108, are rigidly secured, as by welding, to the transverse draft bar 33 mentioned above. Fasteners 111 are employed for detachably connecting the rear ends of the inner bars 107 to the tractor frame when the implement is mounted in position thereon.

Each rockshaft 38 carries at its inner end an apertured arm 109 that, when the implement is in position alongside the tractor (FIG. 2), is adapted to be in coincidental register with an arm 110 on a power operated rockshaft 112 carried as a part of the tractor 10 and actuated by the power cylinder 15 (FIG. 1). The registering arms 109 and 110 have apertures that are adapted to be disposed in alignment and receive a pin 113 that interconnects the arms 109 and 110 and causes them to swing together when the cylinder 15 is actuated.

One of the features of this invention has to do with the convenient and easy connection and disconnection of the implement with and from the tractor. It will be seen from FIG. 2, that each of the frames 32, when disconnected from the tractor, is readily swingable about the axis of the associated pin 94 toward and away from the tractor, the frames 32 and associated parts being swung outwardly and forwardly away from the tractor when the implement is to be disconnected from the tractor, after which the tractor may be backed away from the implement. However, in order to support the implement in its detached relation and, further, to facilitate movement of the implement units toward and away from their attached position, special means are provided, according to this invention. First, the central attaching frame 31 carries a stand 115 that includes a generally vertical bar 116 and, at the lower end of the latter, a foot piece 117. Fixed to the central frame 31 is a sleeve and bracket structure 118 to which the standard 116 is movably connected, being held in different positions of vertical adjustment by a set screw 119. Also, the upper transverse frame bar 86 carries a bracket 121 fastened detachably to the tractor by fastener 122.

Thus, when the tractor, with implement attached, is driven to the place where it is desired to leave the implement and move the tractor away to some other location, the fastener 122 is removed, the set screw 119 loosened, the stand dropped to the ground, and then the set screw 119 is tightened. Thus, the stand will hold the center frame section 31 in position for convenient reattachment to the tractor whenever desired. According to this invention we provide further means facilitating the movement of the outer frames to positions accommodating disconnection of the tractor.

Referring now to FIG. 3, an attaching bracket 125 is provided with clamp means 126 by which the transverse bar 127 of the bracket may be rigidly fixed to the associated frame bar 33. The outer end of the bar 127 carries a sleeve 131 having a set screw 132. The sleeve 131 receives the standard 134 of a ground engaging unit 135. The latter comprises a wheel 136 rotatably carried in the yoke 137 that is secured to the lower end of the standard 134. Before the implement is placed in operation, the set screw is loosened and the standard 134 raised to the position shown in FIG. 1, which disposes the ground engaging wheel 136 in an upper inoperative position. However, when the implement is to be disconnected from the tractor, the set screw 132 is loosened, either before or after the stand 115 is lowered, and the standard 134 lowered until the wheel 136 engages the ground. As will be seen from FIG. 2, there are two of the supporting units 124 and, when lowered to the ground, the standards 134 are turned so that the axes of the two wheels 136 pass through or closely adjacent the vertical axis 105 about which each frame 32 swings when shifted toward and away from the tractor.

The purpose of the wheels 136 is to facilitate rolling each frame 132 into and out of attached and detached position. Due to the fact, however, that the plow bottoms 24 and associated parts are not supported on the wheels 136, it will be necessary when swinging the implement into and out of attached position to skid the plow bottoms 24 across the ground. However, the wheels 136 do support the frame 32 and associated parts, which are a major portion of the implement so far as the weight is concerned, and it is relatively simple and easy to manually shift the bottoms across the ground while the frames, being supported on the wheels 136, are moved from working position to the other transport position, or vice versa.

According to a further feature of this invention, we provide a gauge wheel directly ahead of each of the lister bottoms 24. Each gauge wheel unit is indicated in its entirety by the reference numeral 140 and includes a ground engaging wheel 141 journaled at the lower end of the vertical standard 142 that is secured, as by clamps 143, to the laterally turned end 144 of a generally fore-and-aft extending bar 145, the rear portion of which is pivoted, as at 146, to a pair of bracket plates 147 bolted to the beam standard 25 alongside the pivot bracket 51. The rear end of the bar 145 is turned upwardly, as at 148, and receives an adjusting set screw 149 that bears against the upper portion of the beam 25. By adjusting the set screw 149, the vertical position of each gauge wheel 141 relative to the associated lister bottom 24 may be adjusted or varied, as desired. Suitable stop means such as a bolt or pin 150 limits the downward movement of the gauge wheel 141 relative to the beam 25 when the lister bottom is raised relative to the tractor into a transport position (FIG. 4), as by extension of the power cylinder 15.

In operation, when any of the lister bottoms 24 encounter excessively hard ground or an obstruction or the like, the associated spring 61 yields and permits the associated beam 25 to pivot about the pin or shaft 48. As a result of this action, a downward force is exerted on the gauge wheel 141 which reacts against the beam 25 and causes the lister bottom to be raised into a position of lesser depth, thus reducing the load. The set screws 149 provide for bringing all of the lister bottoms 24 to the same depth of operation under normal working conditions.

When the cylinder 15 is extended, the bottoms 24 are raised upwardly into a transport position, best shown in FIG. 4. After the bottoms 24 are raised clear of the ground continued raising action will permit the gauge wheel arms 145 to drop down until the upper ends 148 contact the associated stop pins 150. This relative lowering of the gauge wheels permits the gauge wheel arms 145 to clear the draft bars 33 and/or other parts, thus accommodating a high lift for the bottoms 24. As will be seen from FIG. 4, the wheels 141 drop down until they are disposed at about the level of the lower points of the tools 24.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. The combination with a tractor mounted implement including detachable frame means comprising a center section and outer sections swingably connected at their laterally inner portions to said center section and shiftable relative to the center section about generally vertical axes from a position susbtantially against the sides for the tractor to a position laterally outwardly thereof, and ground working means connected for generally free vertical movement with said outer frame sections, of frame supporting means for said frame means to facilitate connecting said frame means to and disconnecting it from the tractor, comprising a pair of ground engaging wheel means adapted to rotate about a substantially horizontal axis, and means on the frame and independent of the ground working means connecting each of the ground engaging wheel means with the associated outer frame section in such position that the axis of rotation of the wheel means extends substantially through the vertical axis of swinging of the outer frame section, said connecting means including means to adjust the wheels vertically relative to the ground working means whereby the weight of the outer frame section may be imposed on said wheel means.

2. The combination with a tractor mounted implement including detachable frame means comprising a center section and outer sections swingably connected at their laterally inner portions to said center section and shiftable relative to the center section about generally vertical axes from a position substantially against the sides of the tractor to a position laterally outwardly thereof, and ground working means connected for generally free vertical movement with said outer frame sections, of frame supporting means for said frame means to facilitate connecting said frame means to and disconnecting it from the tractor, comprising generally vertically shiftable ground engaging wheel means, and means mounted on the frame and independent of the ground working means fixing said wheel means to said swingable frame sections in a position to support at least said frame sections when the latter and said ground working means are shifted into and out of position relative to the tractor, the axis of the ground engaging wheel means extending substantially through the vertical axis of swinging of the outer frame section when the frame sections and the ground working means are shifted into and out of position relative to the tractor.

3. The combination with a tractor mounted implement including detachable frame means comprising a center section and outer sections swingably connected at their laterally inner portions to said center section and shiftable relative to the center section about generally vertical axes from a position substantially against the sides of the tractor to a position laterally outwardly thereof, and ground working means connected for generally free vertical movement with said outer frame sections, of frame supporting means for said frame means to facilitate connecting said frame means to and disconnecting it from the tractor, comprising a strut attachable to said center frame section to support the latter when detached from the tractor, means fixing said strut to said center frame section in different vertical positions, generally vertically shiftable ground engaging wheel means attachable to said outer frame sections and including rotatable supporting wheels, and means mounted on the frame and independent of the ground working means connecting said wheel means to said outer frame sections so that a line through the axis of each of said rotatable wheels extends through the associated vertical axis, whereby said supporting wheels support the outer frame sections when the latter are swung about said vertical axes toward and away from the sides of the tractor.

4. The combination with a tractor mounted implement including detachable frame means comprising a center section and outer sections swingably connected at their laterally inner portions to said center section and shiftable relative to the center section about generally vertical axes from a position substantially against the sides of the tractor to a position laterally outwardly thereof, and ground working means connected for generally free vertical movement with said outer frame sections, of frame supporting means for said frame means to facilitate connecting said frame means to and disconnecting it from the tractor, comprising a strut attachable to said center frame section to support the later when detached from the tractor, means fixing said strut to said center frame sections in different vertical positions, generally vertically shiftable ground engaging wheel means attachable to said outer frame sections and including rotatable supporting wheels, and means connecting said wheel means to said outer frame sections so that a line through the axis of each of said rotatable wheels extends through the associated vertical axis, whereby said supporting wheels support the outer frame sections when the latter are swung about said vertical axis toward and away from the sides of the tractor, said generally vertically shiftable wheel means including a standard, a socket member receiving said standard for both rotary and generally vertical displacement in said socket member, means connecting said socket member to the associated frame section, and means adjustably fixing each standard in selected position, both vertically and rotationally, in the associated socket member.

5. In combination with a tractor having a generally fore-and-aft extending body, a transversely mounted rockshaft extending through a forward portion of the tractor, the ends of the rockshaft being disposed adjacent opposite sides of said tractor body, and power operated means mounted on the tractor and adapted to rock said rockshaft, of an implement having an intermediate portion adapted to be secured to the forward end of the tractor and outer sections swingably connected at their laterally inner portions to said intermediate portion and shiftable relative to said intermediate portion about generally vertical axes from position substantially against the sides of the tractor to a position laterally outwardly thereof, said outer sections of said implement having rockshaft means mounted in a position to be concentrically alined with the tractor mounted rockshaft when the outer sections are disposed in a position substantially against the sides of the tractor, and means adapted to interconnect said tractor mounted rockshaft with said rockshaft means when the latter are in a concentrically alined position with said tractor rockshaft.

References Cited in the file of this patent
UNITED STATES PATENTS

| | | |
|---|---|---|
| 1,946,403 | Johnson | Feb. 6, 1934 |
| 2,368,156 | Orelind et al. | Jan. 30, 1945 |
| 2,513,955 | Mott | July 4, 1950 |
| 2,533,542 | Walz et al. | Dec. 12, 1950 |
| 2,569,389 | Seaholm | Sept. 25, 1951 |
| 2,584,217 | Morkoski | Feb. 5, 1952 |
| 2,697,974 | Silver et al. | Dec. 28, 1954 |
| 2,752,837 | Parker | July 3, 1956 |
| 2,777,377 | Johnson et al. | Jan. 15, 1957 |
| 2,927,652 | Harrington et al. | Mar. 8, 1960 |
| 2,962,104 | Antici | Nov. 29, 1960 |